Patented Apr. 6, 1937

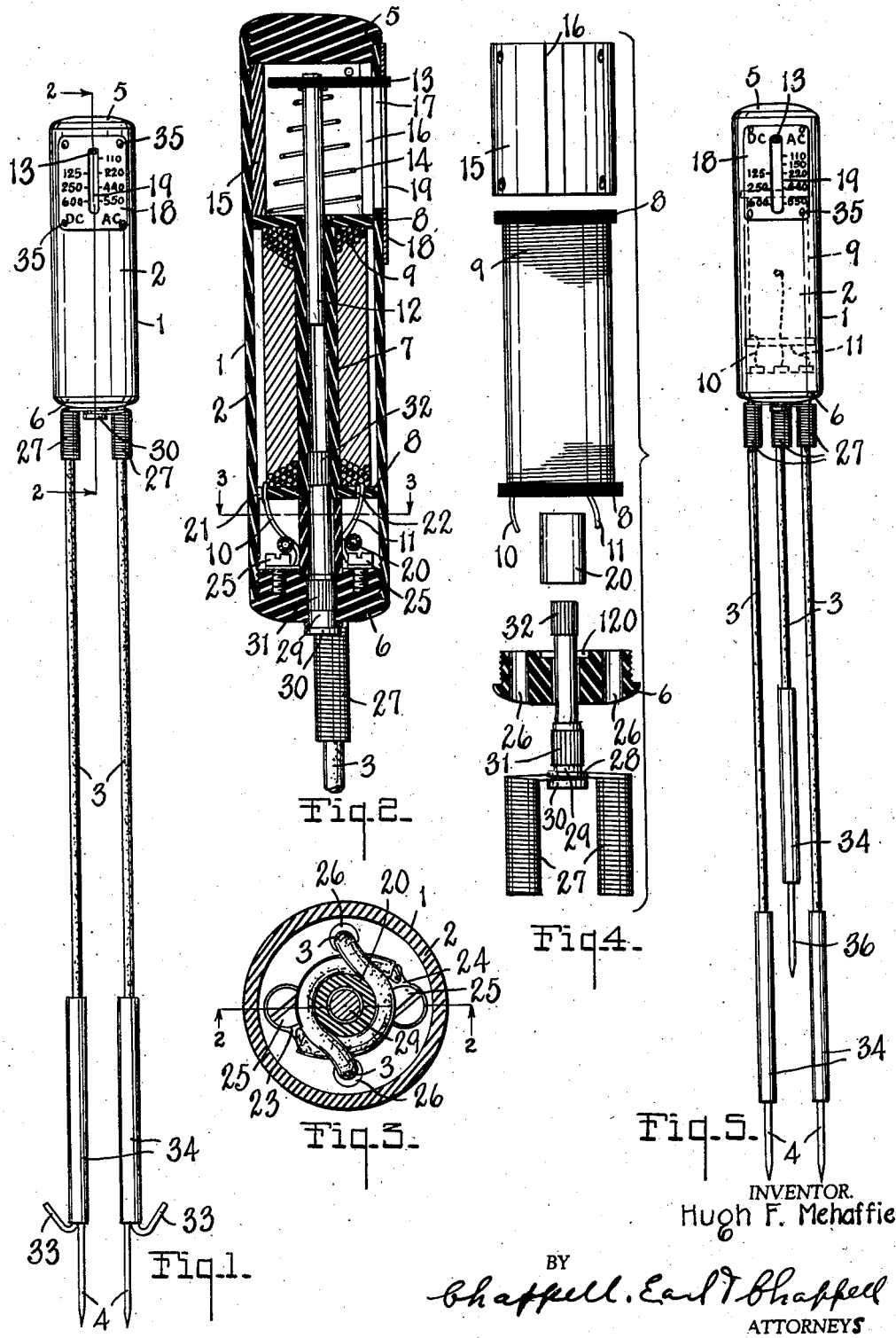

2,075,860

UNITED STATES PATENT OFFICE 2,075,860

VOLTAGE TESTER

Hugh F. Mehaffie, Kalamazoo, Mich., assignor to The Wigginton Company, Kalamazoo, Mich.

Application December 13, 1935, Serial No. 55,185

12 Claims. (Cl. 171—95)

The main objects of my invention are:

First, to provide a portable voltage tester which is compact in form, rugged in construction and relatively inexpensively produced.

Second, to provide a voltage tester for testing either an alternating or direct potential to determine the voltage thereof.

Third, to provide a device for locating a blown fuse or open circuit, characterized by a novel and improved mounting for the leads thereto.

Fourth, to provide a device which is extremely flexible in that readings of high and lower potentials may be made with uniform nicety.

Other objects relating to details and economies of my invention will definitely appear from the description to follow. The invention is defined in the claims.

Preferred embodiments of my invention are illustrated in the accompanying drawing, in which:

Fig. 1 is a front elevational view of a commercial embodiment of my invention.

Fig. 2 is an enlarged fragmentary sectional view taken on the line 2—2 of Figs. 1 and 3.

Fig. 3 is an enlarged sectional view in plan taken on the line 3—3 of Fig. 2.

Fig. 4 is an exploded view showing elements of my invention.

Fig. 5 is a front elevational view illustrating a modified embodiment of my invention.

By the features of my invention, I have provided a voltage tester of improved construction which avoids several serious difficulties experienced with prior voltage testers of similar nature, i. e., a tendency of the lead wires to become worn or broken adjacent the body of the tester, as well as a tendency of the mounting means for the leads to become loosened. These difficulties are not experienced with my improved device, which is to be hereinafter specifically described. Further, the parts are all so assembled as to maintain their position even when roughly or carelessly used.

In the drawing, reference numeral 1 indicates generally the voltage tester comprising a body portion 2 having lead wires 3 connecting pointed testing terminals 4 thereto. The body portion 2 consists of a tubular casing formed of a suitable insulating material such as fiber and is closed at opposite ends by plugs or end members 5 and 6 which are threaded in the casing. Plugs 5 and 6 are likewise formed of insulating material.

Within casing 2, I dispose a coil spool 7 having flanges 8, the spool being preferably made of insulating material such as hard fiber or a phenolic condensation product. I wind spool 7 with wire 9 to form a solenoid, the ends of the wire being numbered 10 and 11. The core or armature 12 of the solenoid is slidably mounted in the spool 7 and carries at its outer end a radially extending pointer finger 13. A spring 14 is interposed between finger 13 and the upper flange 8 of the spool, whereby the armature is resiliently urged outwardly.

A cylindrical sleeve or thimble 15, preferably of fiber, is placed interiorly of tubular casing 2 for the purpose of spacing the spool 7 therein, the sleeve being provided with a slot 16 coinciding with a slot 17 formed in the casing. A metallic plate 18 is similarly slotted at 19 and carries suitable calibrations, plate 18 being fastened to casing 2 by brads or screws or other suitable fasteners 35. It will be seen that slots 16, 17 and 19 form a path for finger 13 which extends therethrough and cooperates with the calibrations on plate 18 to indicate the value of the voltage being tested. As illustrated in Figs. 1 and 5, the calibrations are made in terms of direct current and alternating current, being disposed on opposite sides of slot 19.

Flange 8 of spool 7, which is at the end thereof opposite the elements just described, is spaced from plug 6 by a collar or sleeve 20 seating in a circular recess 120 in plug 6 and is slotted at 21 and apertured at 22 to provide outlets for the ends 10 and 11 respectively of wire coil 9. The ends 10 and 11 are electrically connected as by a soldered joint to terminals 23 and 24 respectively of the leads 3 and the terminals are anchored by screws 25 threaded into plug 6.

As clearly indicated in Figs. 3 and 4, plug 6 is drilled to provide oppositely disposed holes 26 in which leads 3 are received and, further, the leads are given a three-quarter turn about sleeve 20 and interlaced before being secured at their terminals 23, 24 by screws 25. It will be noted that each lead 3 is overlapped near its inner end by the other lead. Due to this arrangement, a snubbing action is exerted by each of the leads 3 upon the other, whereby possible tension imparted to leads 3 will be relieved by the binding or gripping action and the terminal connections relieved of the pull or strain.

I have provided novel protecting means for the leads 3 adjacent the casing 2 and plug 6, consisting of spring elements 27 surrounding the respective leads, the spring elements being integrally formed and provided with a loop 28 medially thereof. Spring elements 27 are carried on a pin 29, being retained against accidental displacement therefrom by the enlarged end 30 on the pin. As shown, loop 28 encircles pin 29 adjacent end 30. Pin 29 is provided with knurled portions 31 and 32 which are adapted to be driven into plug 6 and spool 7 respectively, as illustrated in Fig. 2, whereby a firm gripping action is provided. Leads 3 are, of course, passed through spring elements 27 and are protected thereby from wear and breaking at the bottom of the plug 6. By the provision of knurled portions 31 and 32, a rigid connection between plug 6 carrying the leads 3 and spool 7 is assured merely by driving in the plug, and also one whereby the strain is taken off the leads in screwing the plug into or out of the casing. Likewise, the coil on the coil carrying spool and plug 6 are restrained from rotation, with the result that connecting leads 10 and 11 are relieved of strain. It will be appreciated that the construction just described imparts greatly in flexibility to my testing device and contributes equally to the ruggedness thereof.

At the free ends thereof leads 3 carry pointed terminals 4, guard members 33 and insulated handle members 34, the terminal members 4 being pointed to facilitate the introduction thereof into the insulation of a line.

In Fig. 5, I illustrate an embodiment of my invention provided with three leads 3 one of which is tapped in coil 9 at the middle thereof and carries a pointed testing terminal 36, so that when either of the outer terminals 4 is used in connection with the central terminal 36 a greater deflection of the finger 13 may be had on 110–220 voltage readings.

I have illustrated and described my improvements in embodiments which I have found very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. A voltage tester comprising a tubular casing, a pair of end plugs threaded therein, a solenoid mounted in said casing and comprising a hollow spool and an armature, one of said plugs being drilled to provide passages for a pair of leads and a central hole, means for protecting said leads adjacent said plug comprising a pair of springs integrally joined by a looped portion, and means for supporting said means comprising a pin receiving said looped portion and having spaced knurled areas adapted to be driven into said spool and said plug at the central hole.

2. A voltage tester comprising a tubular casing, a pair of end plugs threaded therein, a solenoid mounted in said casing and comprising a hollow spool and an armature, one of said plugs being drilled to provide passages for a pair of leads and a central hole, means for protecting said leads adjacent said plug comprising a pair of springs, and means for supporting said means comprising a pin having spaced knurled areas adapted to be driven into said spool and said plug at the central hole.

3. In a voltage tester a tubular casing, an end plug threaded therein, a hollow spool mounted in said casing, said plug providing passages for a pair of leads, means for protecting said leads adjacent said plug comprising a pair of springs, and means for supporting said means comprising a pin having spaced knurled areas adapted to be driven into said spool.

4. In a voltage tester a tubular casing, an end plug threaded therein, a hollow spool mounted in said casing, said plug providing passages for a pair of leads and a central hole, means for protecting said leads adjacent said plug comprising a pair of springs, and means for supporting said means comprising a pin having spaced knurled areas adapted to be driven into said plug at the central hole.

5. In a voltage tester a closed tubular casing, an end member for one end of said casing, said end member having a pair of holes providing passages, a spool mounted in said casing and having a coil wound thereon, a hollow sleeve concentric with said spool and spacing said spool from said end member, and a pair of leads extending through said passages and secured to said end member, said leads substantially encircling said sleeve and being intertwined over and under one another whereby they are frictionally gripped against said sleeve and end member.

6. In a voltage tester a closed tubular casing, an end member for one end of said casing, a spool mounted in said casing and having a coil wound thereon, a hollow sleeve concentric with said spool and spacing said spool from said end member, and a pair of leads secured to said end member, said leads substantially encircling said sleeve and being intertwined over and under one another whereby they are frictionally gripped against said sleeve and end member.

7. In a voltage tester a closed tubular casing, an end member for one end of said casing, a spool in said casing, means spacing said spool from said end member, and a pair of leads secured to said end member, said leads substantially encircling said means and being intertwined over and under one another whereby they are frictionally gripped against said means and end member.

8. In a voltage tester, the combination with a tubular casing of insulating material and end members of insulating material, of a coil provided with a supporting spool of insulating material disposed in said casing in spaced relation to both end members thereof, said casing having a longitudinal slot at the outer end thereof, a thimble disposed in said casing between the end member at the outer end thereof and the spool and constituting a spacing member therefor and having a slot registering with the slot of said casing, a slotted indicia plate having a slot registering with said slot in said casing secured thereto by fastening members engaging said thimble, a tubular spacing member between the inner end of said spool and the inner end member, and an anchoring pin pressed into said lower end member and spool and having knurled portions engaging the said members.

9. In a voltage tester, the combination with a tubular casing and an end member, of a coil provided with a supporting spool disposed in said casing in spaced relation to said end member, said casing having a longitudinal slot at the upper end thereof, a thimble disposed in said casing between the end member and the spool and constituting a spacing member therefor and having a slot registering with the slot of said casing, and a slotted indicia plate having a slot registering with said slot in said casing secured thereto by fastening members engaging said thimble.

10 In a voltage tester, the combination with a tubular casing and an end member, of a coil provided with a supporting spool disposed in said casing in spaced relation to said end member, said casing having a longitudinal slot at the upper end thereof, a thimble disposed in said casing between the end member and the spool and having a slot registering with the slot of said casing, and a slotted indicia plate having a slot registering with said slot in said casing secured thereto by fastennig members engaging said thimble.

11. In a voltage tester, the combination with a tubular casing of insulating material and an end member of insulating material, of a coil provided with a supporting spool of insulating material disposed in said casing in spaced relation to said end member, a tubular spacing member between said spool and the end member, and an anchoring pin pressed into said end member and spool and having knurled portions engaging the said member.

12. In a voltage tester, the combination with a tubular casing of insulating material and an end member of insulating material, of a coil provided with a supporting spool of insulating material disposed in said casing in spaced relation to said end member, a tubular spacing member between said spool and the end member, and an anchoring pin pressed into said end member and spool.

HUGH F. MEHAFFIE.